United States Patent [19]
Johnson

[11] Patent Number: 5,257,797
[45] Date of Patent: Nov. 2, 1993

[54] TRACTOR HITCH

[76] Inventor: Jerry A. Johnson, Rte. 1, Box 217, Devils Lake, N. Dak. 58301

[21] Appl. No.: 863,102

[22] Filed: Apr. 3, 1992

[51] Int. Cl.$^5$ .............................................. B60D 1/18
[52] U.S. Cl. .................................. 280/477; 280/490.1; 172/248
[58] Field of Search .................. 280/490.1, 477, 478.1, 280/479.1, 479.2, 479.3; 172/248, 272, 439

[56] References Cited

U.S. PATENT DOCUMENTS

| | | | |
|---|---|---|---|
| 3,791,456 | 2/1974 | Koch | 172/248 X |
| 4,153,270 | 5/1979 | Brockmiller | 280/490.1 |
| 4,215,876 | 8/1980 | Jacks | 280/490.1 X |
| 4,424,982 | 1/1984 | Weiss | 172/439 X |
| 4,564,209 | 1/1986 | Kingsley | 280/490.1 X |

FOREIGN PATENT DOCUMENTS

| | | | |
|---|---|---|---|
| 1065281 | 9/1958 | Fed. Rep. of Germany | 280/479.1 |
| 1156263 | 10/1963 | Fed. Rep. of Germany | 172/248 |
| 1527924 | 10/1978 | United Kingdom | 280/479.1 |

*Primary Examiner*—Margaret A. Focarino
*Assistant Examiner*—Florian Zeender
*Attorney, Agent, or Firm*—Burd, Bartz & Gutenkauf

[57] ABSTRACT

A hydraulic hitch mounted on the back of a tractor has a pair of first upright tubular members that slide into second upright tubular members fixed to the tractor frame. A pair of piston and cylinder assemblies are used to raise and lower a draw bar attached to the first tubular members. The draw bar movably supports a tongue having a connector used to connect the hitch to an implement.

18 Claims, 5 Drawing Sheets

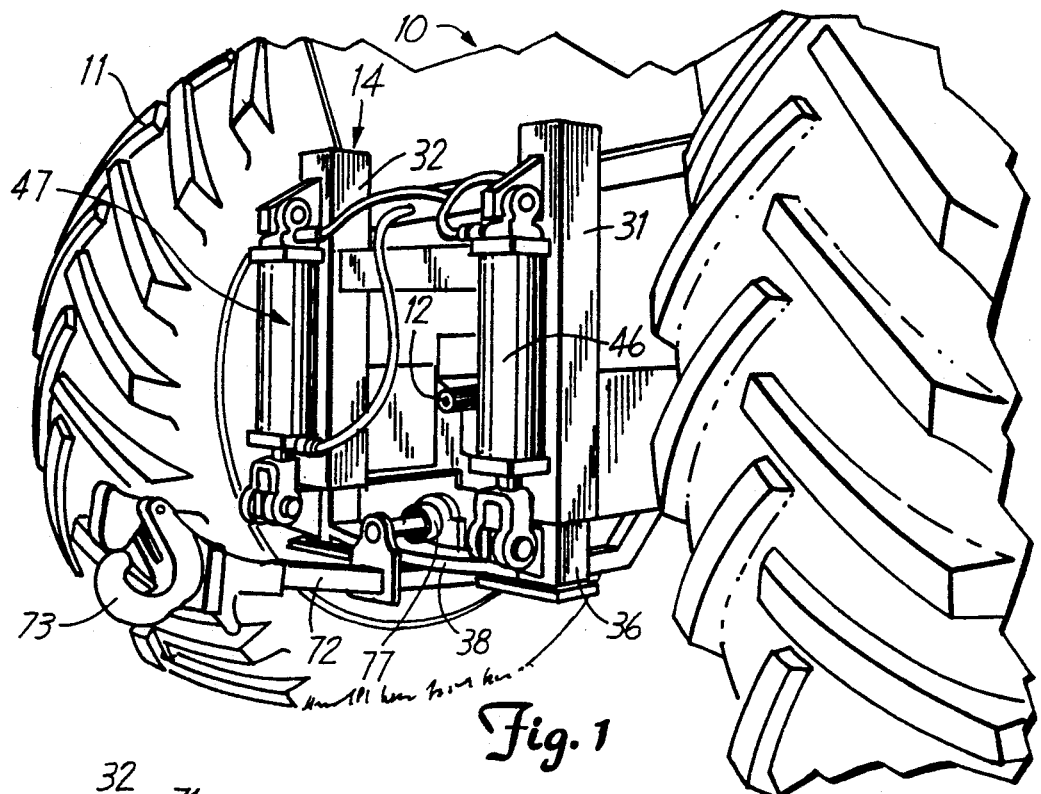
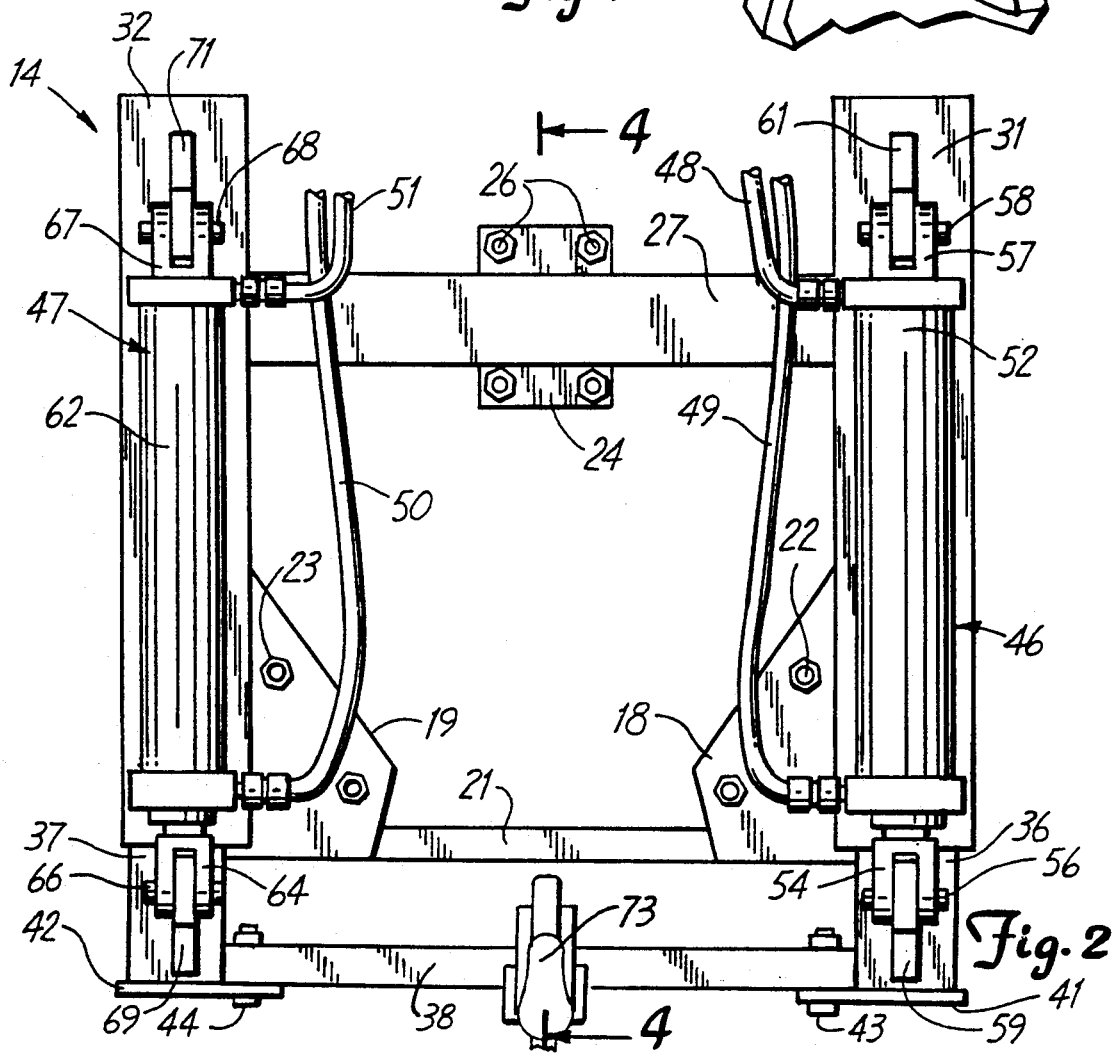

TRACTOR HITCH

FIELD OF THE INVENTION

The invention relates to hitches mountable on tractors for connecting equipment and implements to the tractor. The hitch is a hydraulic operated hitch mounted on the rear of a tractor.

BACKGROUND OF THE INVENTION

Commonly, the method to hook up equipment and implements to a tractor utilizes a drop pin to attach the equipment to the tractor draw bar. Hooking up farm equipment having heavy towing tongues requires two people; one person to back up the tractor and the other person to pin the equipment to the draw bar of the tractor. The towing tongue of the equipment has to be raised or jacked up to the height of the draw bar. Oftentimes, the jacks used fail. Also, it is difficult to maneuver the tractor into alignment for hook-up to the implement. A person often has to back up several times to correctly position the tractor relative to the towing tongue of the implement. A person has to stand between the tractor and the equipment being hooked up in order to insert the drop pin through the draw bar and the equipment. Standing behind the tractor to drop a pin into the draw bar can be dangerous. The towing tongue of the equipment may fall to the ground or onto a person causing injury.

SUMMARY OF THE INVENTION

The invention is directed to hydraulic hitch mountable on the transmission casing of a tractor. The hitch has a pair of extendible and contractible power devices, such as hydraulic cylinders, operable to vertically raise and lower a transverse draw bar to a selected height to facilitate the hook-up of equipment and implements to the tractor. The hitch has a pair of telescoping members to guide the vertical movement of the draw bar and support the hydraulic cylinders adjacent the telescoping members. The telescoping members also accommodate lateral forces applied to the draw bar.

The telescoping members include a pair of fixed upright tubes connected to the rear of the tractor transmission casing. A bracket joined to each upright tube is fastened to the tractor transmission casing to fix the position of the tube on the tractor. A transverse tube extending between the upright tubes is secured to the tractor to further support the upright tubes. Tubular members telescope with a sliding fit into the fixed upright tubes. The tubular members are linear beams having generally square cross sections. Each upright tube has a generally square longitudinal passage and an open lower end to slidably accommodate a tubular member. A transverse draw bar is secured to the lower ends of the tubular members. Each tubular member has an inwardly extending horizontal plate fastened to the draw bar. Piston and cylinder assemblies connected to the upright tubes and tubular members operate to move the tubular members in and out of the upright tubes to selectively raise and lower the draw bar. The piston and cylinder assemblies ar supplied with fluid under pressure from a pump of the hydraulic system of the tractor. A control valve is used to direct the flow of hydraulic fluid under pressure to and from the cylinder assemblies thereby selectively raise or lower the draw bar. A tongue having a connector for connection to equipment and implements is movably mounted on the draw bar with a holder. The draw bar is concave shaped to allow the holder and tongue to swing from side to side if desired.

The hitch is used to hook implements and equipment to a tractor by a single operator without the operator having to leave the cab of the tractor. The hydraulic cylinders operate to lower the draw bar and tongue to the equipment height. The movement of the draw bar is guided by the telescoping tubular members. The need to jack the equipment up to the height of the tongue is eliminated. Equipment resting on the ground can be automatically connected and disconnected from the hitch. Connecting equipment to the hitch and changing equipment is completed quickly and easily. Also, the chance of injury to the operator is reduced.

Additional objects and advantages of the hydraulic hitch mounted on the rear of a tractor are embodied in the following detailed description of a preferred embodiment of the invention and accompanying drawing.

DESCRIPTION OF DRAWING

FIG. 1 is a perspective view of the hitch of the invention mounted on a tractor;

FIG. 2 is a rear elevational view of the hitch of FIG. 1 in the up position;

DESCRIPTION OF PREFERRED EMBODIMENT

Figure 3:
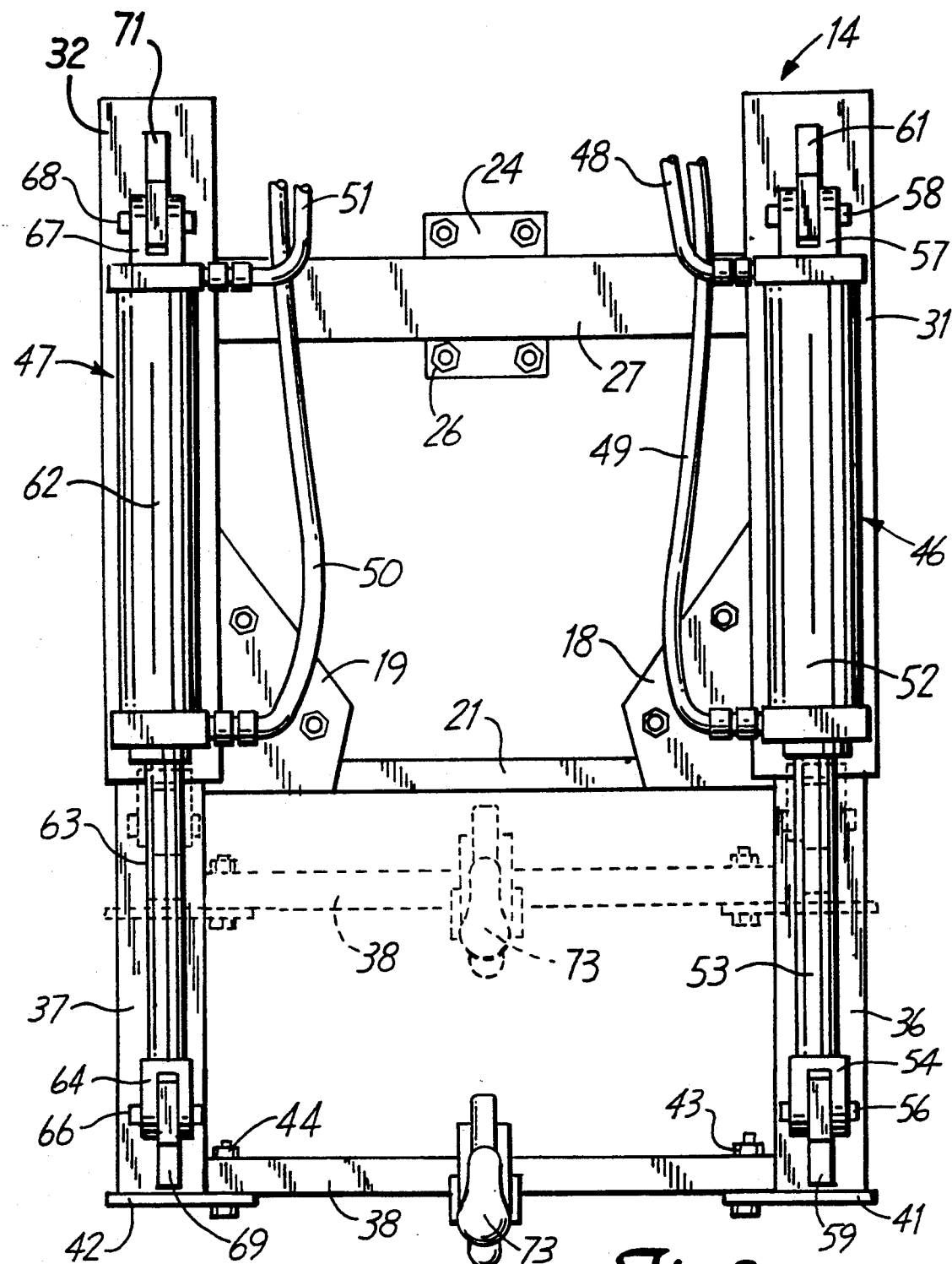
FIG. 3 is a rear elevational view of the hitch of FIG. 1 in the down position.

Referring to FIG. 1, there is shown the rear of a motor vehicle, such as an implement tractor 10 having a transmission housing or casing 13 supported above ground by drive wheels 11. Casing 13 is a conventional box-shaped housing having a PTO shaft 12 projecting rearwardly therefrom. A shield 28 connected to casing 13 extends over shaft 12. Tractor 10 is illustrative of a type of vehicle usable with the hydraulic hitch of the invention, indicated generally at 14 in FIGS. 1 to 6 of the drawing. Other types of vehicles and trailers can be equipped with hydraulic hitch 14.

Figure 4:
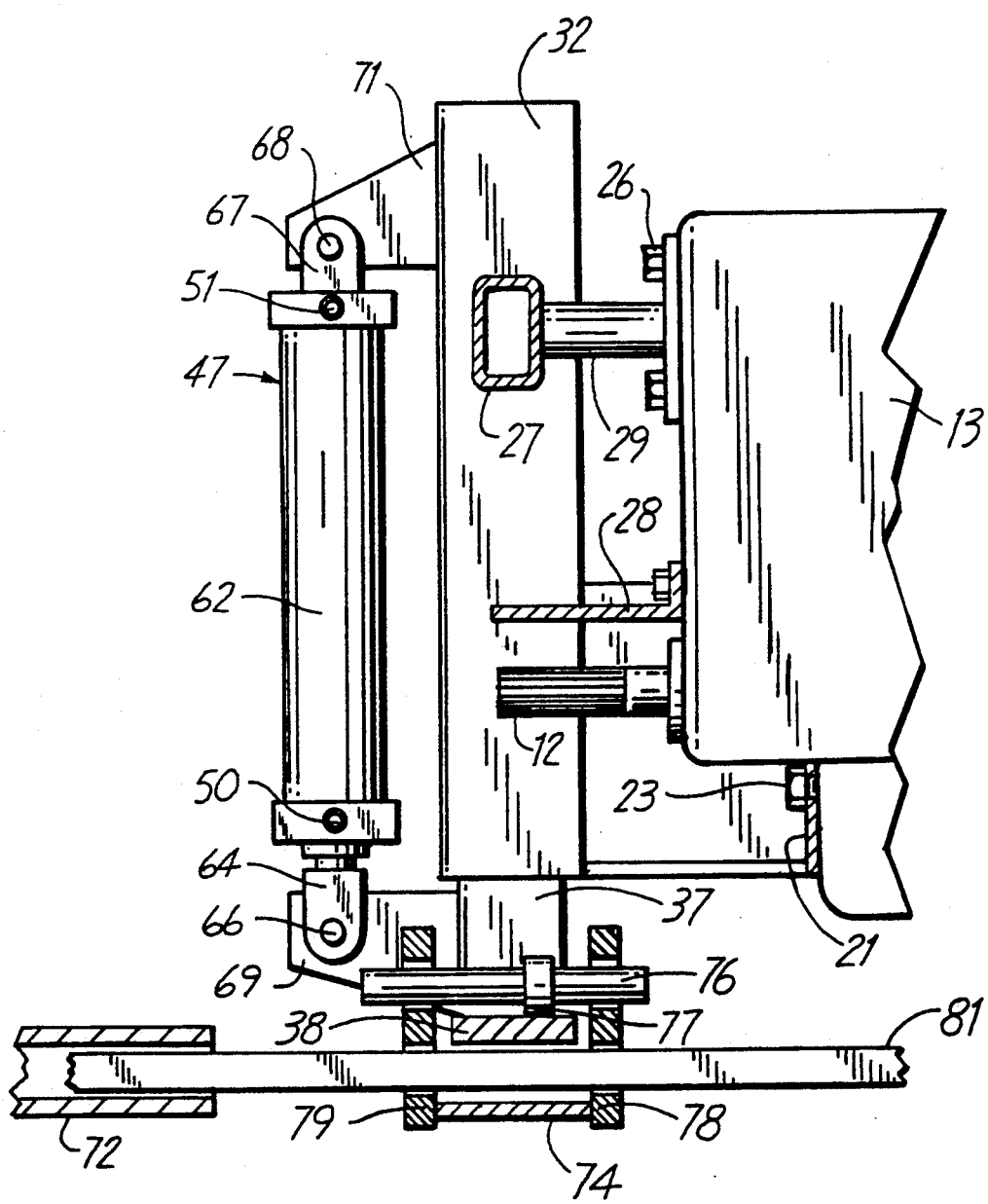
FIG. 4 is a sectional view taken along the line 4—4 of FIG. 2.
Figure 5:
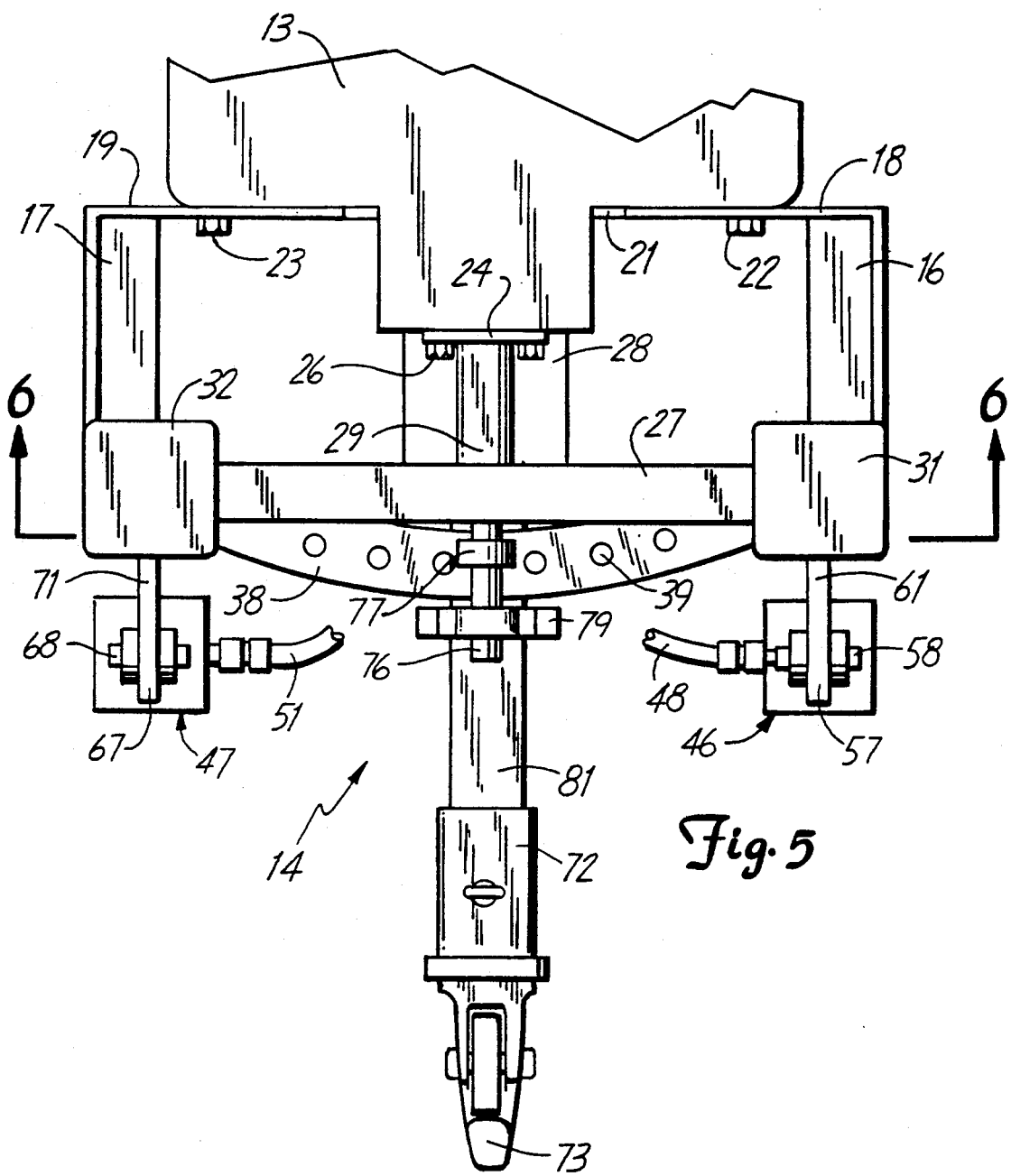
FIG. 5 is a top plan view of the hitch of FIG. 1.

Referring to FIGS. 2 and 5, hitch 14 has a pair of longitudinal L-shaped side brackets 16 and 17 having forward transverse plates 18 and 19. A plurality of bolts 22 and 23 secure plates 18 and 19 to lower corner areas of casing 13. A transverse support or bar 21 secured by welds or the like to plates 18 and 19 is located adjacent the bottom edge of casing 13. A third transverse plate 24 is secured to casing 13 with a plurality of bolts 26. Plate 24 is joined to an upper transverse support or beam 27 with a relatively short longitudinal member or bracket 29. Bracket 29 extends between plate 24 and beam 27 and is secured thereto with welds or the like. As shown in FIG. 4, plate 24, beam 27 and bracket 29 are separated from shaft 12 with the generally horizontal shield or guard 28.

Returning to FIG. 2, telescoping guide members have a pair of upright tubes 31 and 32 secured to opposite ends of transverse beam 27. The top ends of tubes 31 and 32 are located adjacent the top rear portions of casing 13. The bottom ends of tubes 31 and 32 are secured to the outer ends of side brackets 16 and 17. This holds tubes 31 and 32 in a fixed relation relative to casing 13. The telescoping guide members also have tubular members 36 and 37 that telescope into tubes 31 and 32 thereby vertically guide draw bar 38 when draw bar 38 is raised or lowered with linear actuators 46 and 47 and take up lateral forces subjected to the hitch. Other types of fasteners and brackets can be used to secure tubes 31 and 32 to casing 13.

Figure 6:
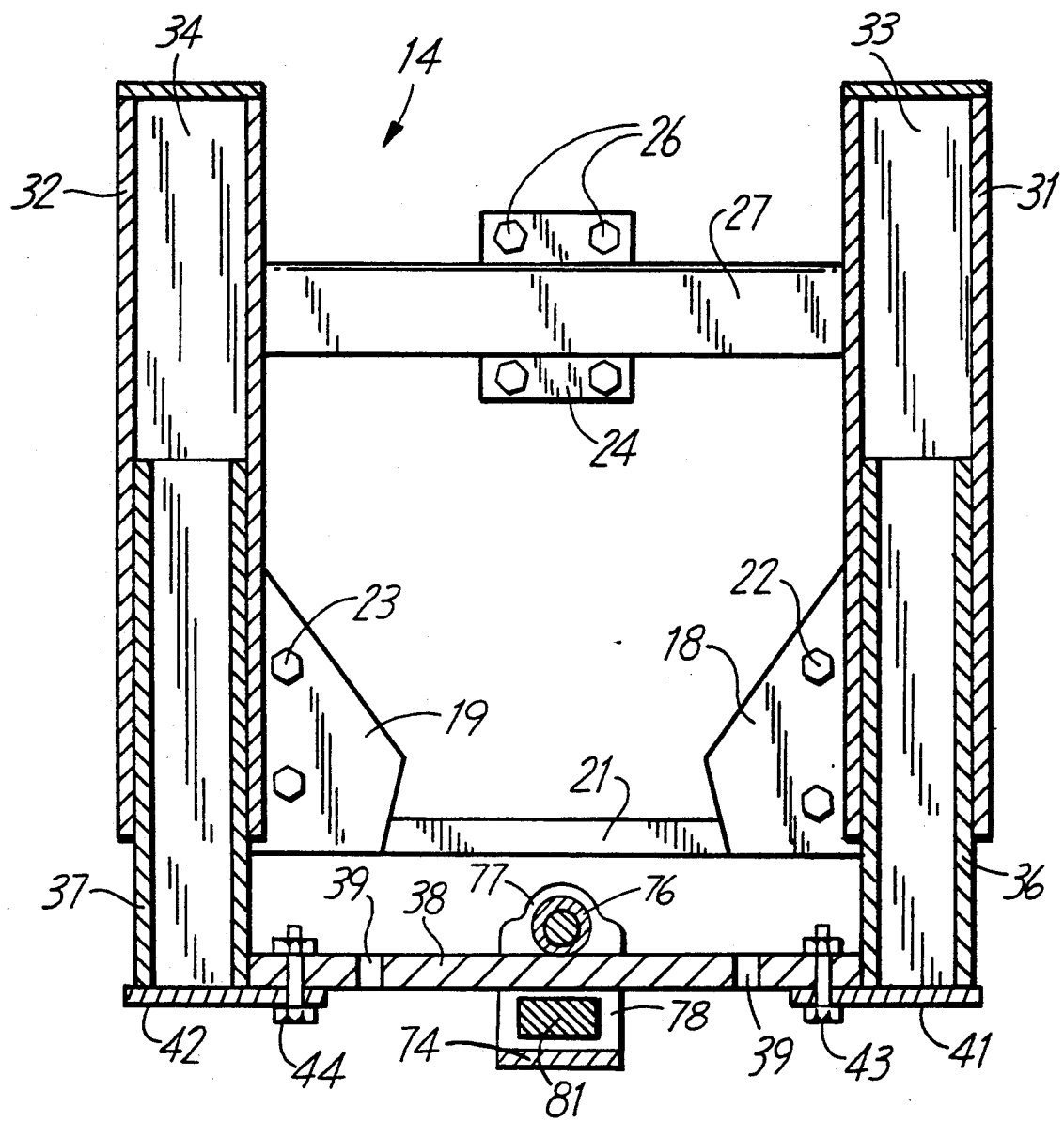
FIG. 6 is a sectional view taken along line 6—6 of FIG. 5.

As shown in FIG. 6, tubes 31 and 32 have closed upper ends and longitudinal generally square passages 33 and 34. The lower ends of tubes 31 and 32 are open. Tubular generally square members 36 and 37 telescope into the lower ends and passages 33 and 34 of tubes 31 and 32. Tubular members 36 and 37 are slidable within tubes 31 and 32 to guide draw bar 38 when bar 38 is moved with linear actuators 46 and 47 to a selected vertical height and accommodate lateral forces subjected to the hitch. The opposite ends of draw bar 38 are fastened to tubular members 36 and 37 with a plurality of bolts 43 and 44. Base plates 41 and 42 jointed to the lower ends of tubular members 36 and 37 have inwardly extending horizontal ends located below the ends of draw bar 38. Bolts 43 and 44 extend through draw bar 38 and plates 41 and 42 to secure bar 38 to tubular members 36 and 37.

As shown in FIG. 3, tubular members 36 and 37 are connected to linear actuators, illustrated generally at 46 and 47 as double acting hydraulic fluid cylinder assemblies. Other types of linear expandable and contractible power devices can be used to selectively raise and lower the draw bar 38. Cylinder assembly 46 has a cylinder 52 accommodating an elongated piston rod 53. A connector 54 joined to the outer end of piston rod 53 is connected with a pin 56 to a bracket 59 secured to the lower end of tubular member 36. The upper end of cylinder 52 has a connector 57 that is connected with a pin 58 to a bracket 61 secured to the upper end of tube 31. Cylinder assembly 47 is a double acting cylinder 62 accommodating a linear piston rod 63. The outer end of piston rod 63 is joined to a connector 64 connected with a pin 66 to a bracket 69 secured to the lower end of tubular member 37. The upper end of cylinder 62 has a connector 67 connected with a pin 68 to a bracket 71 secured to the upper end of tube 32. Piston and cylinder assemblies 46 and 47 are located behind and in longitudinal vertical alignment with tubes 31 and 32.

As shown in FIG. 3, cylinder assemblies 46 and 47 are supplied with hydraulic fluid under pressure from a pump (not shown) connected to a tank located within casing 13 and a valve (not shown). The pump operates to draw hydraulic fluid from the tank and deliver the fluid to the valve which is connected with lines or hoses 48, 49, 50 and 51 to opposite ends of hydraulic cylinders 52 and 62 whereby the operator of vehicle 10 can selectively expand or contract cylinder assemblies 46 and 47. This moves draw bar 38 to a selected vertical height thereby moves connector 73 secured to tongue 72 to the equipment height. The pump can be driven by the motor of vehicle 10 or a separate electric motor.

Referring to FIG. 5, draw bar 38 movably supports a longitudinal tongue 72 having a connector 73 used to connect hitch 14 to an implement. Tongue 72 has an elongated link 81 extending below draw bar 38 and pivotally secured to the bottom of casing 13. A support 74 movably mounted on draw bar 38 supports tongue 72. Support 74 has a pair of holders 78 and 79 located on opposite front and back sides of draw bar 38. Holders 78 and 79 have upper aligned holes accommodating a pin 76. A ring 77 engaging the top of draw bar 38 surrounds pin 76. Link 81 extends through lower aligned openings of holders 78 and 79. Draw bar 38 is a convex curved member having a plurality of laterally spaced holes 39. The convex shape of draw bar 38 enable support 74 and tongue 72 to swing in a lateral, arcuate motion. Ring 77 pivots around pin 76 and rolls along the top surface of draw bar 38 when tongue 72 moves from side to side. Lock pins (not shown) can be placed in holes 39 on one side or opposite sides of tongue 72 to lock the position of tongue 72 or limit its lateral movement.

In use, hydraulic hitch 14 is used to hook up implements and equipment to tractor 10. Tractor 10 is backed into a position locating connector 73 adjacent the connector of the implement. The operator of tractor 10 then expands cylinder assemblies 46 and 47 to move tubular members 36 and 37 in a downward direction, as shown in FIG. 3. This moves draw bar 38 downwardly and pivots tongue 72 and connector 73 to a selected hook up position relative to the connector of the implement. Connector 73 is then moved backward into the implement connector to automatically hook up the implement to tractor 10. Cylinder assemblies 46 and 47 are then contracted to move tubular members 37 and 37 into tubes 31 and 32 thereby raising draw bar 38, to a raised position, as shown in broken lines in FIG. 3. This moves tongue 72 and the implement connected thereto to a transport position. Tractor 10 can be used to move the implement through a field such as to turn soil or the like. When it is desired to switch implements or unhook the implement from tractor 10, cylinder assemblies 46 and 47 are expanded to vertically lower draw bar 38 and pivot tongue 72 downwardly to separate connector 73 from the connector of the implement. Cylinder assemblies 46 and 47 are then contracted to raise draw bar 38 and tongue 72 to a transport position so that the tractor can be driven to a location to hook up to another piece of equipment.

While there has been shown and described a preferred embodiment of the hydraulic hitch of the invention mounted on the rear frame of an implement tractor, it is understood that changes, modifications, and arrangements of structure as well as parts can be made by those skilled in the art without departing from the invention. The invention is defined in the following claims.

I claim:

1. A hitch for a tractor having a casing and an elongated tongue connectable to an implement, comprising: a first upright tube having an upright passage and an open lower end, a second upright tube having an upright passage and an open lower end located laterally adjacent the first tube, means secured to the first and second tubes adapted to be connected to said casing, a first tubular member extended through the open lower end and into the upright passage of a second tubular member extended through the open lower end and into the upright passage of the second upright tube, said first and second tubular members having lower ends projected downwardly from the first and second tubes, transverse bar means secured to the lower ends of the first and second tubular members, means for supporting the tongue on the transverse bar means, a first piston and cylinder assembly located adjacent the first tubular member, means connecting the first piston and cylinder assembly to the first tubular member, a second piston and cylinder assembly located adjacent the second tubular member, means connecting the second piston and cylinder assembly to the second tubular member, means connecting the first and second piston and cylinder assemblies to the upright tubes, and means for supplying fluid under pressure to the first and second piston and cylinder assemblies whereby the first and second piston and cylinder assemblies operate to move the tubular members relative to the upright tubes to selectively raise and lower the transverse bar means and tongue.

2. The hitch of claim 1 wherein: each piston and cylinder assembly includes a cylinder connected to an upright tube, a movable piston located within the cylinder, and piston rod connected to the piston and a tubular member.

3. The hitch of claim 1 wherein: the first and second tubular members are located in slidable engagement with the first and second tubes.

4. The hitch of claim 1 wherein: the means for supporting the tongue on the transverse bar means includes roller means movably mounting the tongue on the transverse bar means.

5. The hitch of claim 1 wherein: the transverse bar means in a concave shaped member having opposite ends, one end of the concave shaped member being secured to a lower end of the first tubular member and the other end of the concave shaped member being secured to a lower end of the second tubular member.

6. The hitch of claim 1 wherein: each tubular member has an inwardly extending plate, and means connecting the plate to the transverse bar means.

7. The hitch of claim 1 wherein: the first upright tube is connected to a first bracket member secured to one side of the casing, the second upright tube is connected to a second bracket member secured to an opposite side of the casing.

8. A hitch for a vehicle having a casing and an elongated tongue connectable to an implement comprising: a first upright tube having an upright passage and an open lower end, a second upright tube having an upright passage and an open lower end, means secured to the first and second tubes adapted to be connected to said casing, a first member extended through the open lower end and into the upright passage of the first upright tube, a second member extended through the open lower end and into the upright passage of the second upright tube, said first and second members having lower ends projected downwardly from said first and second tubes, transverse bar means secured to the lower ends of the first and second members, means for supporting the tongue on the transverse bar means, piston and cylinder means connected to the lower ends of the first and second members and the first and second tubes, and means for supplying fluid under pressure to the piston and cylinder means whereby the piston and cylinder means operate to move the first and second members relative to the first and second tubes to selectively raise and lower the transverse bar means and tongue.

9. The hitch of claim 8 wherein: the transverse bar means is a concave-shaped member secured to the lower ends of the first and second members.

10. The hitch of claim 8 wherein: the first and second members are located in slidable engagement with the first and second tubes.

11. The hitch of claim 8 wherein: the means for supporting the tongue on the transverse bar means includes roller means movably mounting the tongue on the transverse bar means.

12. A hitch for a tractor including casing means having a rear end portion and tongue means connectable to an implement comprising: support means connected to the rear end portion of the casing means, first tube means located rearwardly from the end portion secured to the support means, said first tube means having an upright passage and an open lower end, a second tube means located rearwardly from the end portion secured to the support means, said second tube means having an upright passage and an open lower end, a first member slidably mounted on and telescoping into the passage of the first tube means, a second member slidably mounted on and telescoping into the passage of the second tube means, transverse bar means located below the first and second tube means secured to the first and second members, means for supporting the tongue means on the transverse bar means, extendible and contractible means secured to the first and second tube means and first and second members, and means for operating the extendible and contractible means to move the first and second members relative to the first and second tube means to selectively raise and lower the transverse bar means and tongue means.

13. The hitch of claim 12 wherein: the extendible and contractible means include piston and cylinder means, the piston and cylinder means comprising a pair of piston and cylinder assemblies connected to the first and second members of the first tube means and second tube means.

14. The hitch of claim 13 wherein: the first tube means comprises a first upright tube secured to the support means and one piston and cylinder assembly, and the second tube means comprises a second upright tube secured to the support means and the other piston and cylinder assembly.

15. The hitch of claim 12 wherein: the support means includes a pair of bracket members and a transverse tube, the first and second tube means secured to the bracket members and transverse tube rearwardly from the end portion of the casing.

16. The hitch of claim 15 including: means securing the bracket members and transverse tube to the end portion of the casing.

17. The hitch of claim 12 wherein: the transverse bar has opposite ends, and means securing the ends of the transverse bar means to the first member and second member.

18. The hitch of claim 12 wherein: the extendible and contractible means comprise a pair of linear extendible and contractible power means connected to the tubes and members operable to move the members relative to the tubes to selectively raise and lower the transverse bar means.

* * * * *